United States Patent [19]

Cheesman et al.

[11] Patent Number: 5,556,041
[45] Date of Patent: Sep. 17, 1996

[54] APPARATUS AND METHOD FOR DEBALING BALES

[76] Inventors: Donald C. Cheesman; Mark W. Spencer, both of 993 Lake Country Ct., Oconomowoc, Wis. 53066

[21] Appl. No.: 477,716
[22] Filed: May 23, 1995
[51] Int. Cl.$^6$ .............................. B02C 19/12; B02C 23/08
[52] U.S. Cl. .................... 241/24.14; 241/79.1; 241/200; 241/605
[58] Field of Search ........................... 241/24, 79.1, 200, 241/605, 27, 24.14

[56] References Cited

U.S. PATENT DOCUMENTS

| | | | |
|---|---|---|---|
| 2,820,282 | 1/1958 | Schneider | 29/200 |
| 2,905,346 | 9/1959 | Park et al. | 241/200 X |
| 3,513,522 | 5/1970 | Thomson | 29/200 |
| 3,682,396 | 8/1972 | Whitney | 241/41 |
| 4,072,273 | 2/1978 | Reiniger | 241/24 |
| 4,812,205 | 3/1989 | Silveri et al. | 241/24 X |
| 4,813,614 | 3/1989 | Moore et al. | 241/23 |
| 5,052,098 | 10/1991 | Thumm | 29/564 |
| 5,163,216 | 11/1992 | Ercums | 29/564 |
| 5,303,460 | 4/1994 | Neilsen | 29/564.3 |
| 5,333,799 | 8/1994 | Posthumus | 241/27 |
| 5,350,122 | 9/1994 | Hundt | 241/29 |
| 5,372,316 | 12/1994 | Bateman | 241/191 |

FOREIGN PATENT DOCUMENTS 1021411  6/1983  U.S.S.R. ................. 241/605

Primary Examiner—John M. Husar
Attorney, Agent, or Firm—Robert T. Johnson

[57] ABSTRACT

Disclosure is made of baled material disintegrator, or debaler or pull apart apparatus having a bale conveyor and conveyor chute and at the outlet of the conveyor, a multi picker wheel debaler cartridge suspended on a swing shaft or axle, and hydraulic piston means connected to the debaler cartridge to swing the cartridge to and from the bale to be disintegrated or debaled, and further disclosure is made of removal from a bale of material such as paper, the bale binding wire scrap on breaking of the wire by action of debaler cartridge picker wheels, and a scraper bar with tooth segments extending to the tooth wheel shafts and the teeth of the scraper bar straddle the picker tooth wheels to remove the scrap wire from the shafts of the picker cartridge and collection of the cut bale binding wire on a magnet mount bank, set on an incline at the outlet of the debaler cartridge, and the magnet bank overlaid by an endless conveyor belt, and removal of the binding wire scrap, or other tramp iron from the disintegrated baled material, such as waste paper by means of mounting at an angle, or an incline, the magnet bank, with a rotating endless belt around the magnet bank, under the outlet of the picker cartridge, with discharge of the wire scrap, on the endless belt, over the top end of the inclined endless belt over the inclined magnet mount bank and the debaled material, free of wire scrap, falling off of the bottom of the inclined magnet mount bank and endless belt.

7 Claims, 8 Drawing Sheets

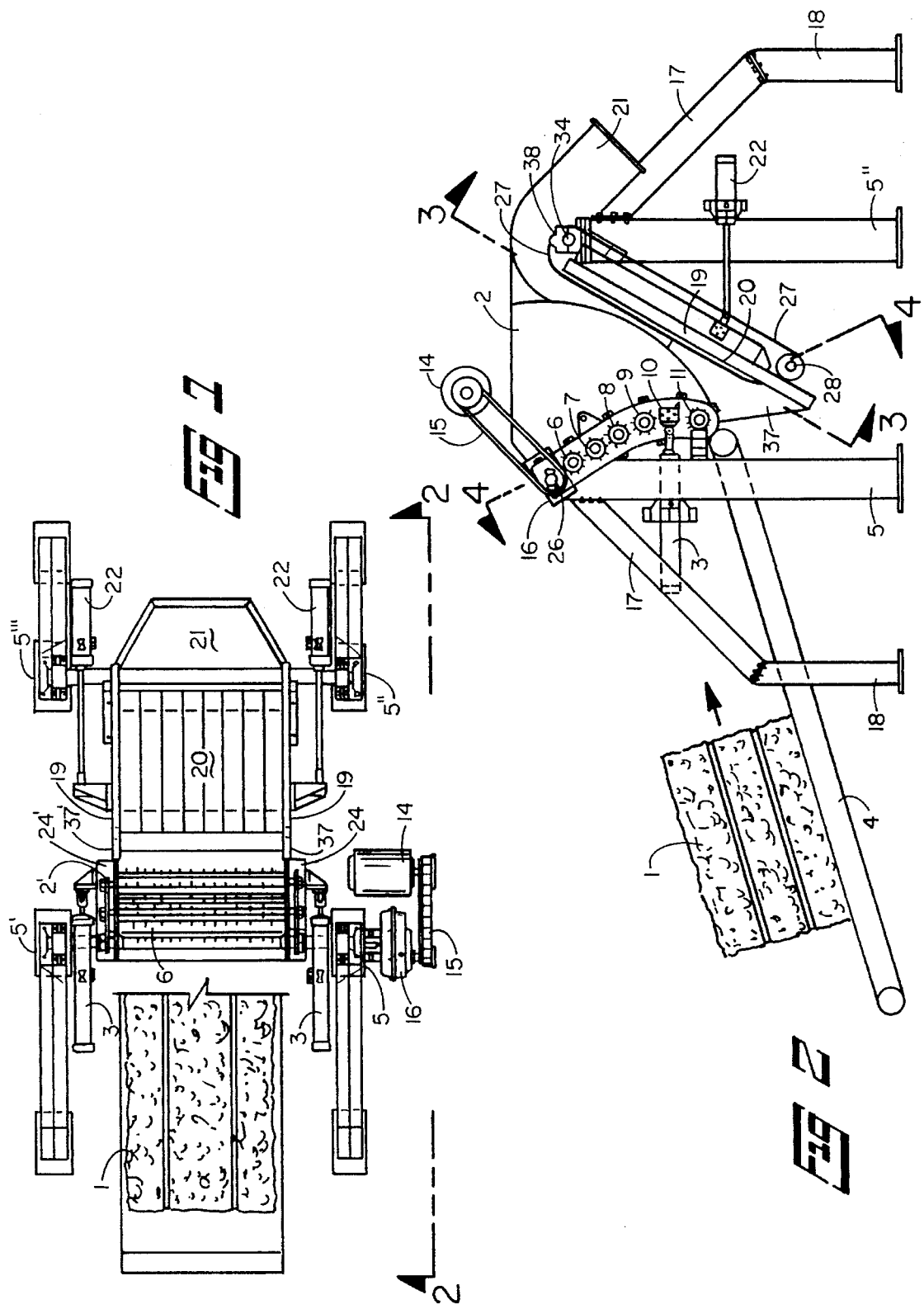

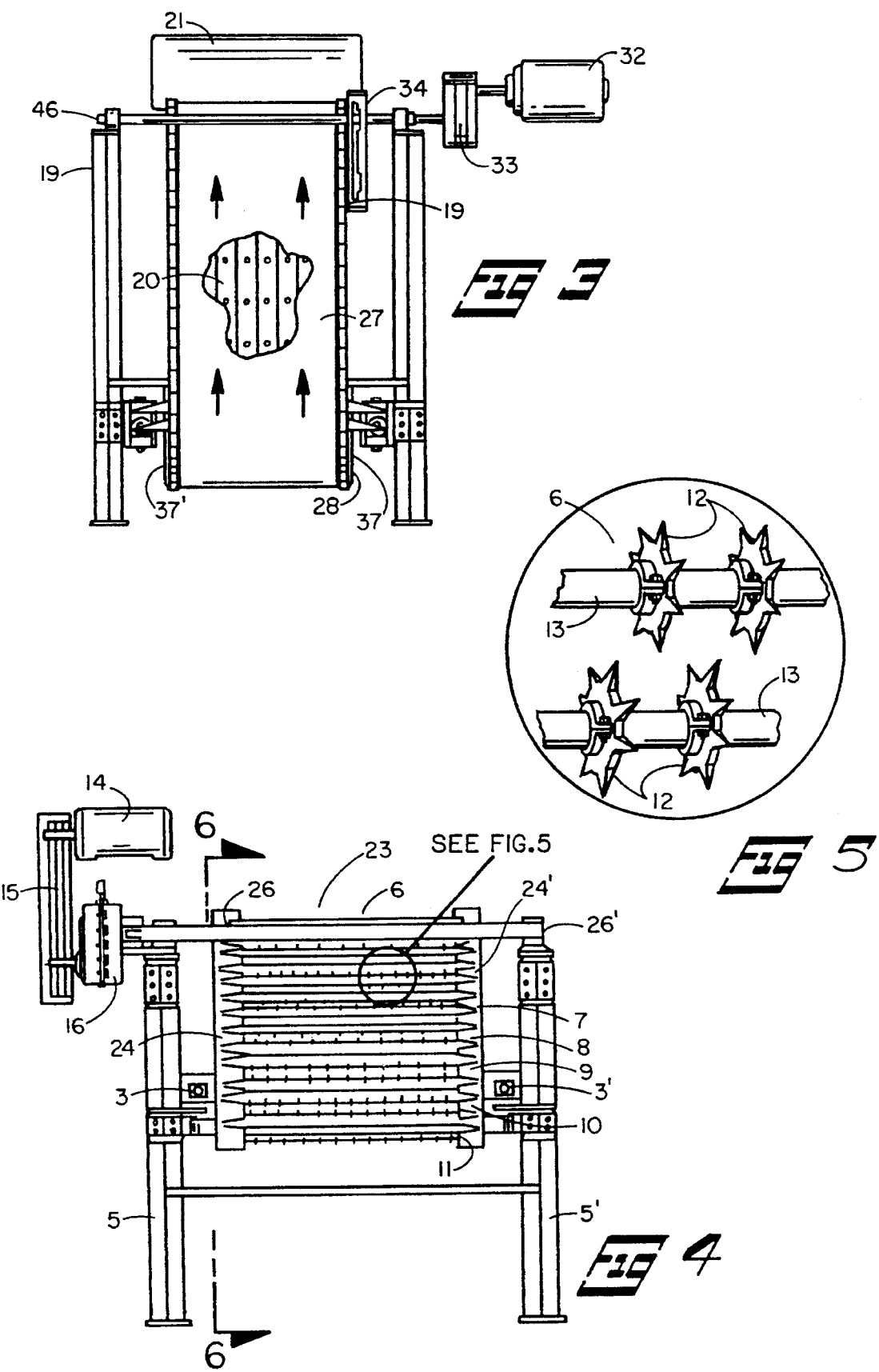

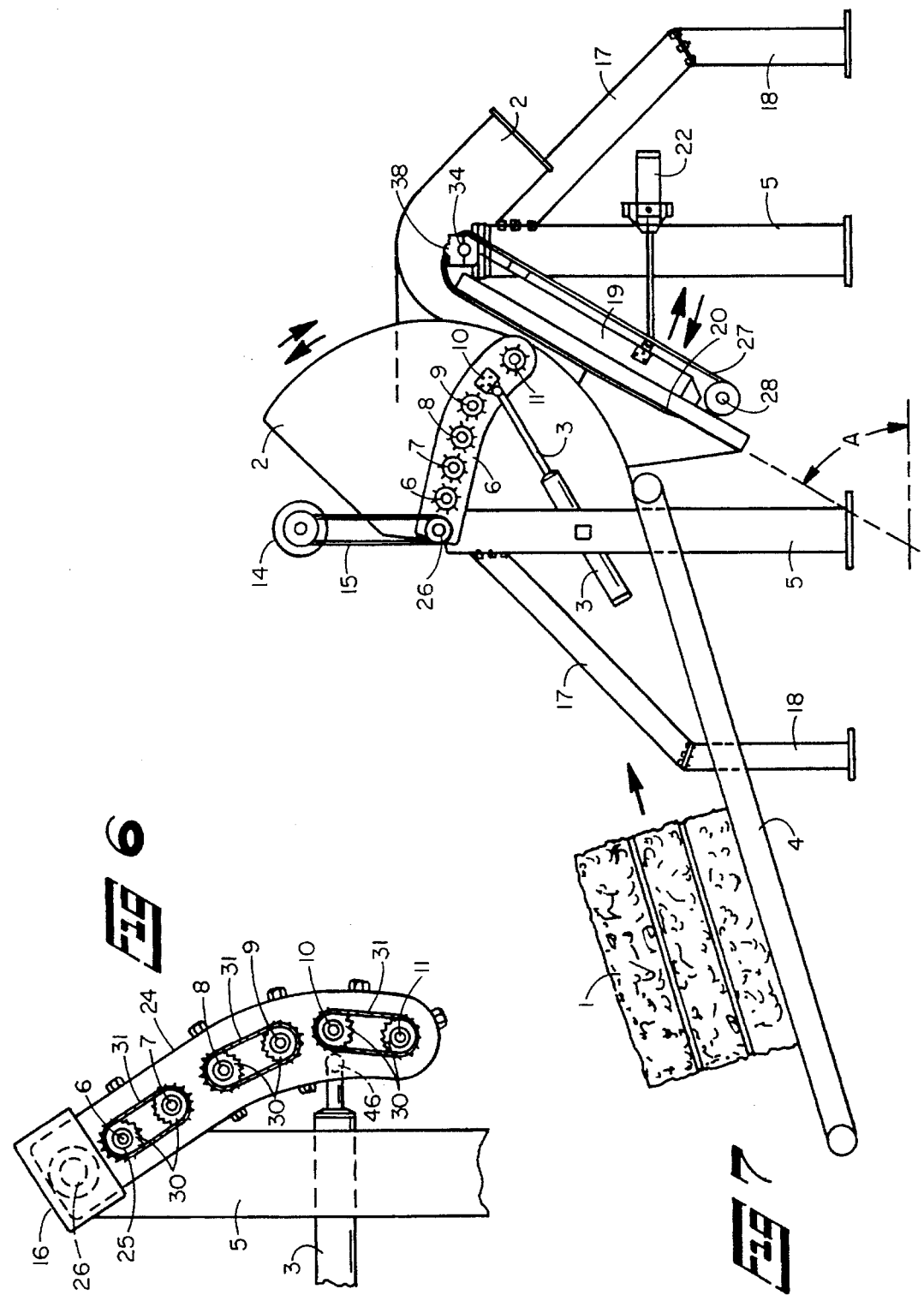

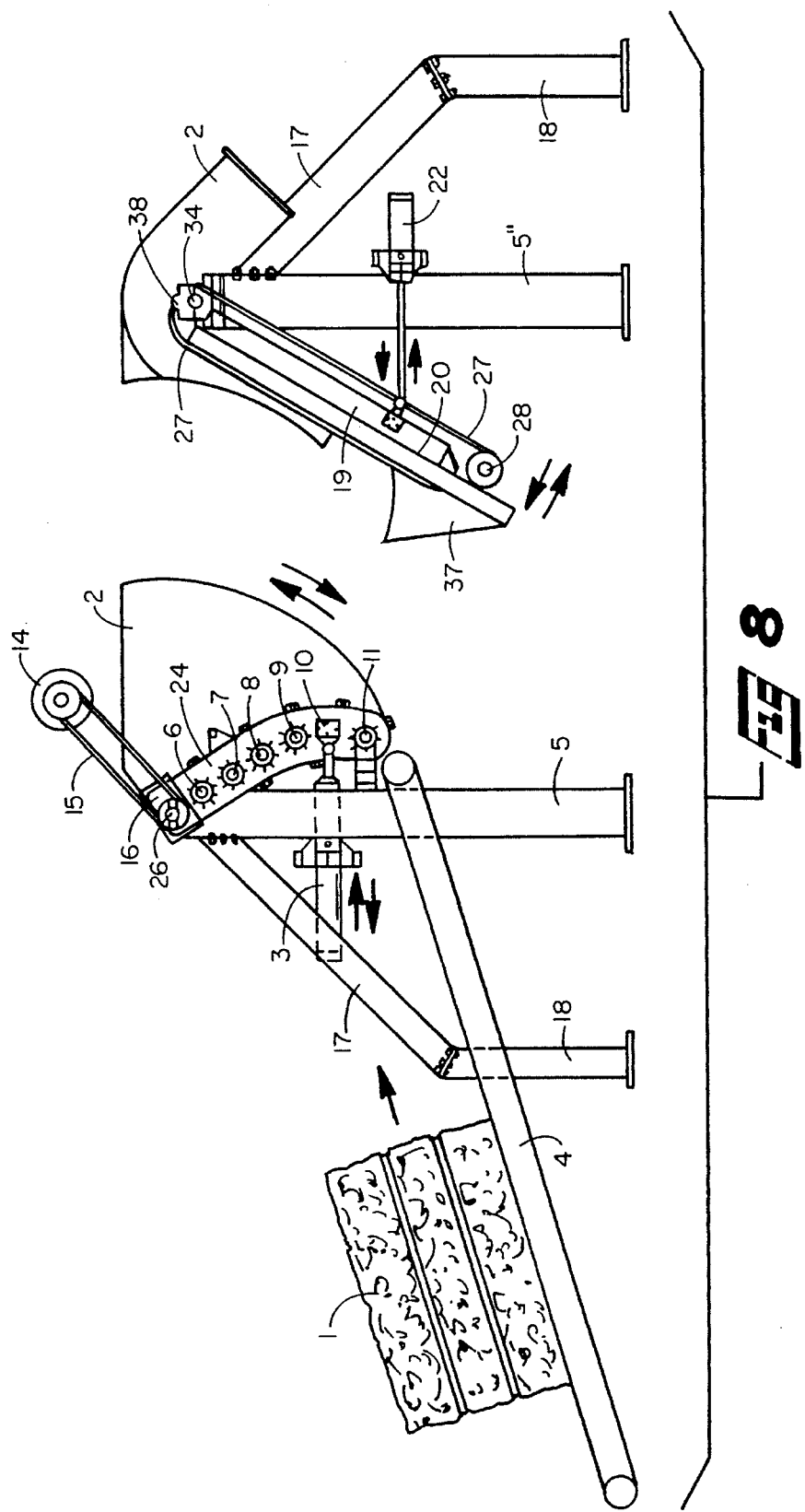

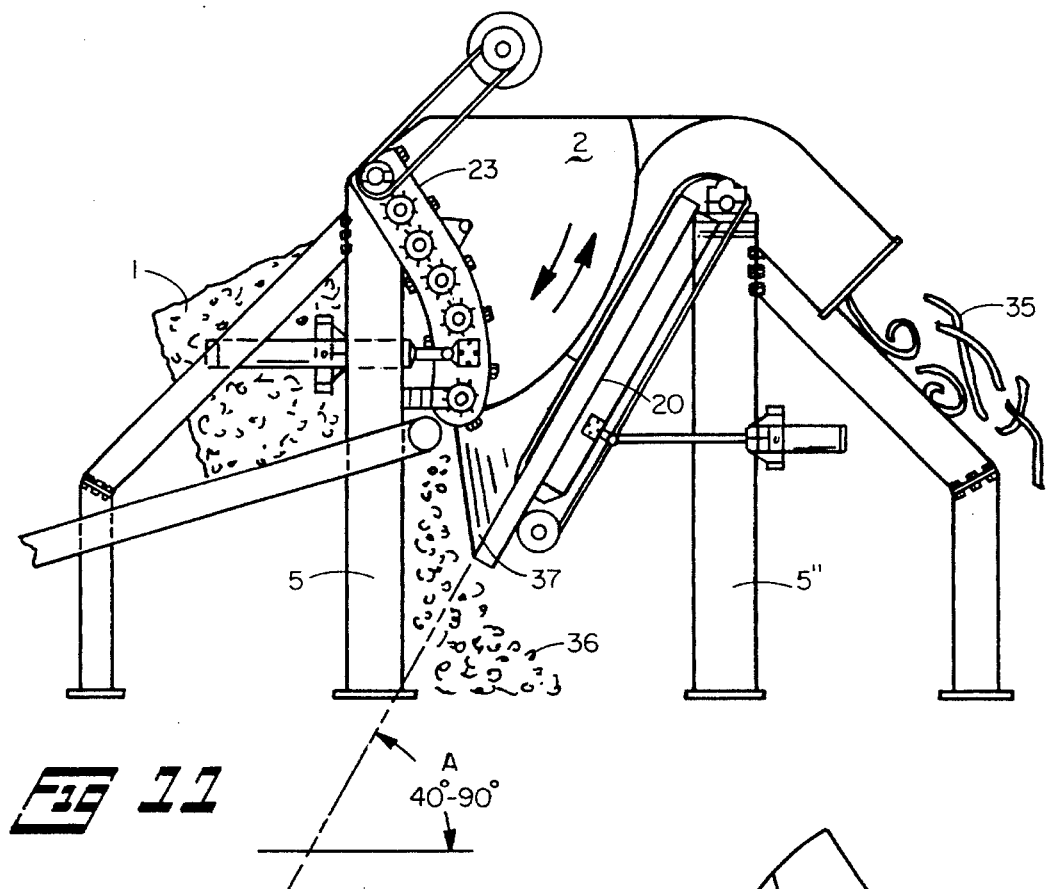
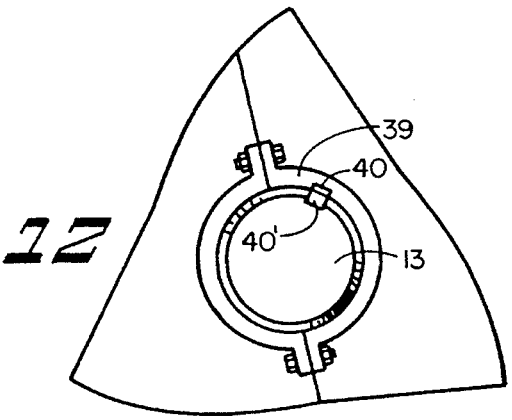
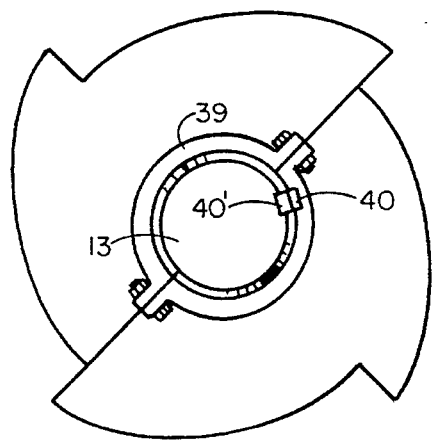

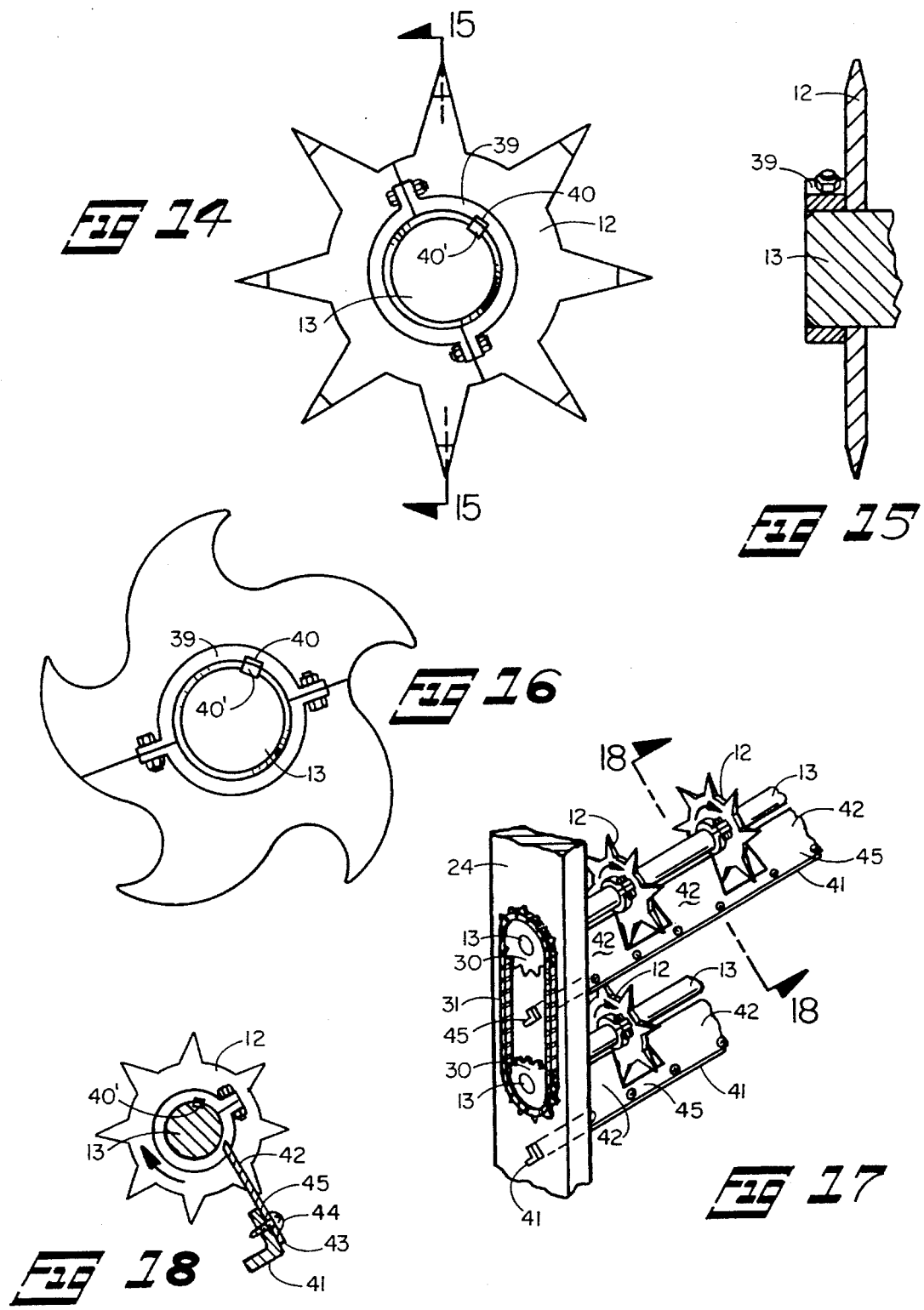

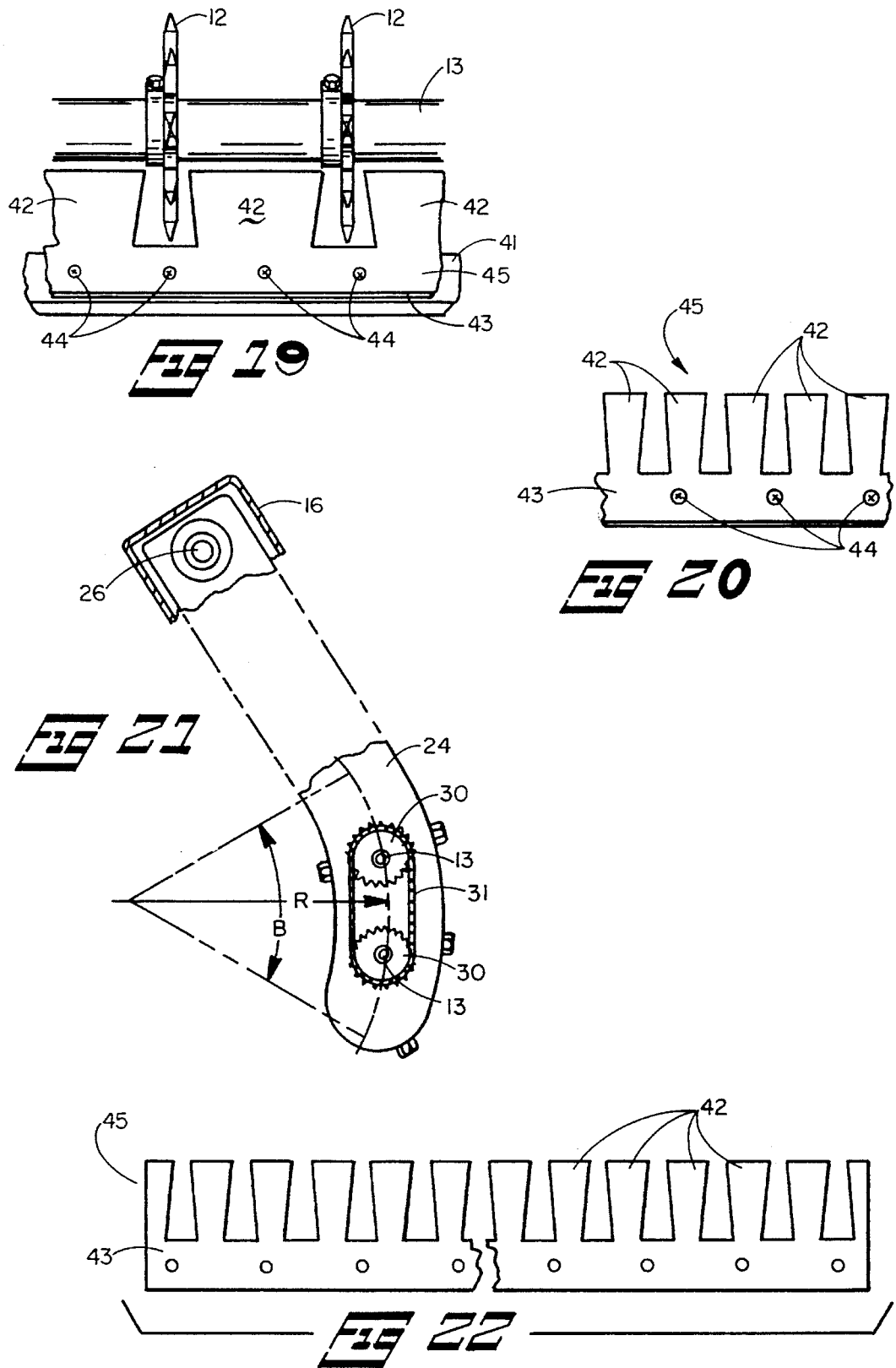

APPARATUS AND METHOD FOR DEBALING BALES

BACKGROUND OF THE INVENTION

FIELD OF THE INVENTION

This invention pertains to apparatus, and method, for disintegrating or debaling in particular, bales of waste office paper, cardboard, corrugated board, wood chips, pulp, hay, straw and plastic, or other similar material.

SUMMARY OF THE INVENTION

The terminology used in this summary and description may use the words "disintegrator" or "debaler", or roots thereof interchangeably, "Disintegration" means in this disclosure the same as "pull apart".

Further in regard to terminology, the word "debaling" or to "debale", is synonymous with the term "pull apart" or "disintegrating".

Disclosure is made of baled material disintegrator or pull apart apparatus and method having a bale conveyor and conveyor chute and at the outlet of the conveyor, a multi picker wheel debaler cartridge suspended on a swing shaft or axle, and hydraulic piston means connected to the debaler cartridge to swing the cartridge to and from the bale to be disintegrated or debaled.

Further disclosure is made of removal from a bale of material such as paper, the bale binding wire or steel strap binding on cutting the binding by action of debaler cartridge picker wheels, and collection of the cut bale binding wire or steel strap binding on a magnet bank, set on an incline at the outlet of the debaler cartridge, and the magnet bank overlaid by an endless conveyor belt, Further disclosure is made of apparatus for removal of the cut binding wire, or steel strapping or other tramp iron from the disintegrated baled material, such as waste paper by mounting at an angle, or an incline, a magnet bank, with an endless belt around the magnet bank, under the outlet of the picker cartridge.

OBJECTS OF THIS INVENTION

An object of this invention is to disclose apparatus for debaling baled material such as waste paper, or cardboard which apparatus comprises a bale conveyor for feeding bales into a picker cartridge mounted at the outlet end of the conveyor and the picker cartridge suspended on pivot bearing mount and the picker cartridge comprised of a plurality of picker tooth wheels mounted on a shaft and a plurality of picker tooth wheel shafts with a plurality of picker tooth wheels mounted thereon and, a magnet mount bank and an endless belt over and around the magnet mount bank and the magnet mount bank hang mounted on a pivot bearing mount and the magnet mount bank mounted diagonally or at an incline under the picker cartridge and, the magnet mount bank, hang mounted on the pivot bearing mount, at a diagonally adjustable or incline angle, by means of a hydraulic cylinder mounted on the free end of the magnet mount bank which free end is the end opposite the hang mount end.

Another object of this invention is to disclose apparatus for debaling bales which apparatus includes a picker cartridge with a plurality of picker shafts and a plurality of picker wheels mounted on each of the picker shafts and sprocket wheels mounted on the outer ends of each of the shafts and, sprocket chain connecting the sprocket wheels in pairs on alternate shaft ends such that all picker shafts are rotatable in concert, and in the same direction and, motive power connected onto at least one of the plurality of picker shafts to rotate all of the plurality of picker axles in concert and in the same direction. Applying the motive power to the upper shaft, nearest the suspended pivot bearing mount.

Another object of this invention is to disclose a scraper bar having scraper bar tooth segments and this scraper bar mounted on angle or "L" iron mount for each shaft of the picker cartridge, and scraper bar tooth segments extending to each shaft, and the tooth segments straddle the picker tooth wheels to thus strip scrap wire from the picker cartridge shafts.

Another object of this invention is to disclose a method of removing scrap binding wire or metal strapping from the flow of debaled material, by means of a magnet mount bank mounted on an incline overlaid by an endless belt mounted on pulleys, for revolving the endless belt around the magnet mount in an upward direction, and as the debaled material falls on the moving endless belt the scrap wire binding is carried upward on the endless belt over the magnet mount bank for disposal while the remainder of the debaled material falls backward from the inclined endless belt over the magnet mount bank, for further processing.

Another object of this invention of debaling is to disclose apparatus for scrap wire binding removal from the debaled bales which apparatus includes a rotatable endless belt mounted on an upper roller pulley and a lower roller pulley and each pulley mounted horizontally, one of the pulleys mounted at the upper end of the magnet mount and one of the pulleys mounted at the lower end of the magnet mount bank and the endless belt mounted lengthwise over and around the magnet mount bank and mounted over the pulleys and motive power connected to at least one of the pulleys, and the motive power comprises an electric motor and drive train and each of pulleys is magnetized.

As noted above, the term "baled material" is to include baled waste paper, cardboard, corrugated board wood chips, paper pulp straw, hay plastics and similar materials.

The word "debale" or derivatives thereof means to disassemble the bale, to pull the bale apart or to disintegrate the bale.

Other objects of this invention will be disclosed and brought forth in the description which follows.

PRIOR ART PERTAINING TO THIS INVENTION

U.S. Pat. No. 2,820,282 for APPARATUS FOR REMOVING TIES FROM PACKAGES. Disclosure is made in this patent of cutting and removing ties from bales and capturing the ties after cutting.

U.S. Pat. No. 3,513,522 for UNBALING MACHINE. Disclosure is made in this patent of apparatus for cutting and capturing wire banding around a bale.

U.S. Pat. No. 3,682,396 for REFUSE DISINTEGRATOR. This patent discloses mechanism for breaking open bundles and fluffing or shredding the refuse.

U.S. Pat. No. 5,052,098 for MEANS FOR REMOVING WIRES FROM BALES IN PARTICULAR WASTE PAPER BALES. In this patent there is disclosed apparatus for removing baling wire from waste paper bales by means of a cutting knife and means to grip the wire.

U.S. Pat. No. 5,163,216 for WIRE CUTTING AND REMOVAL METHOD. Disclosure is made of a wire cutting channel and means on the wire cutting knife to hold the wire.

U.S. Pat. No. 5,303,460 for DEWIRING APPARATUS FOR BALES. Disclosure is made of a bale splitter to sever the strapping of the bale atop the bale.

U.S. Pat. No. 5,333,799 for BALE CUTTING MACHINE. This patent discloses apparatus and method for breaking down compressed bales of hay, and the apparatus utilizes a single blade knife spanning the width of the bale.

U.S. Pat. No. 5,350,122 for WASTE RECYCLING DEVICE. Disclosure is made in this patent of a preshredding chamber and roller and a shredding chamber and roller.

U.S. Pat. No. 5,372,316 for WASTE PROCESSING MACHINE. Disclosure is made of a machine with a combination chipper, swing hammer and hog hammer.

None of the above prior art patents disclose either singly or collectively, matter which would make this present invention anticipated or obvious.

BRIEF DESCRIPTION OF DRAWINGS

FIG. 1—Plan view of de-baler.

FIG. 2—Side elevational view of de-baler.

FIG. 3—Elevational view of steel wire or banding or tramp iron removal magnet.

FIG. 4—Front elevation view of picker cartridge

FIG. 5—Magnified sections of picker cartridge axles mounted on picker cartridge frame side.

FIG. 6—Enlarged view of one side only drive/driven cartridge picker shafts, sprockets and sprocket chains mounted on cartridge picker shaft frame.

FIG. 7—Side elevational view of magnet bank mount and debaler with picker cartridge in raised position.

FIG. 8—Side elevational expanded view of debaler and magnet bank mount showing picker cartridge in lowered working position.

FIG. 11—Side elevational view of assembled apparatus showing separate outlet for collection of debaled material and wire/steel strap binding outlet from magnet bank belt.

FIG. 12—Side view of 3 tooth picker tooth wheel.

FIG. 13—Side view of 4 tooth picker tooth wheel.

FIG. 14—Side view of 8 tooth picker tooth wheel.

FIG. 15—Cross section view of 8 tooth picker tooth wheel.

FIG. 16—Side view of 5 tooth picker tooth wheel.

FIG. 17—Sectional view of picker cartridge and scraper bar.

FIG. 18—Magnified view of scraper bar mount on picker cartridge in relation to picker shaft.

FIG. 19—Magnified front elevational view of segment of picker cartridge shaft, picker tooth wheels and scraper bar.

FIG. 20—Scraper bar segment.

FIG. 21—Picker cartridge side frame elevational view of side.

FIG. 22—Scraper bar including tooth segments and base.

DRAWING LEGENDS

1—Wire bound bale
2, 2'—Hood.
3, 3'—Hydraulic cylinders for picker cartridge incline adjustment.
4—Bale conveyor.
5, 5'—Mount pillars for debaler frame assembly.
5", 5'"—Mount pillars for magnet mount bank.
6–11—Picker cartridge shafts or axles with picker tooth wheels (to be referred to as legend 13 in the further description)
12—Picker tooth wheel mounted on picker shaft.
13—Picker shaft.
14—Motor drive.
15—Drive belts from motor to drive gear.
16—Picker cartridge drive gear box either forward, reverse and speed control.
17—Frame support brace.
18—Frame support brace extension.
19—Wire or strap steel banding scrap removal magnet mount frame.
20—Wire or strap steel binding scrap removal magnet mount bank.
21—Exhaust hood of magnet mount to dump scrap binding.
22,22'—Hydraulic cylinders for magnet bank.
23—Picker cartridge.
24-24' Picker cartridge side frame.
25—Swing or pivot pin mount bearing for picker cartridge frame.
26—Pivot or swing shaft bearing mount for picker cartridge.
27—Endless belt over magnetic bank.
28—Magnetized idler roll for endless belt.
29—"See through" to illustrate endless belt over the magnet bank components.
30, 30'—Drive/driven sprockets.
31, 31'—Drive/driven sprocket chain.
32—Magnetic bank belt drive motor.
33—Magnet bank endless belt gear drive speed control.
34—Magnetized roller pulley drive for endless belt around magnet bank.
35—Wire or steel strap banding scrap and tramp iron.
36—Debaled material (free of scrap wire binding)
37, 37'—Side wall retainer of magnet mount.
38—Swing or pivot bearing mount for magnet mount bank.
39—Split hub welded to split picker tooth wheel.
40,40'—Key way in picker tooth wheel and hub and picker wheel shaft.
41—Angle or "L" iron mount for scraper bar.
42—Scraper bar tooth segments.
43—Base of scraper bar
44—Fasteners attaching scraper bar to angle or "L" iron.
45—Scraper bar including tooth segments and base.
A—Angle of incline or slant of magnet mount bank.
B—Arc of curvature of end of picker cartridge side frame—side elevational view.
R—Radius of curvature of picker cartridge side frame—side elevational view.

Figure 9:
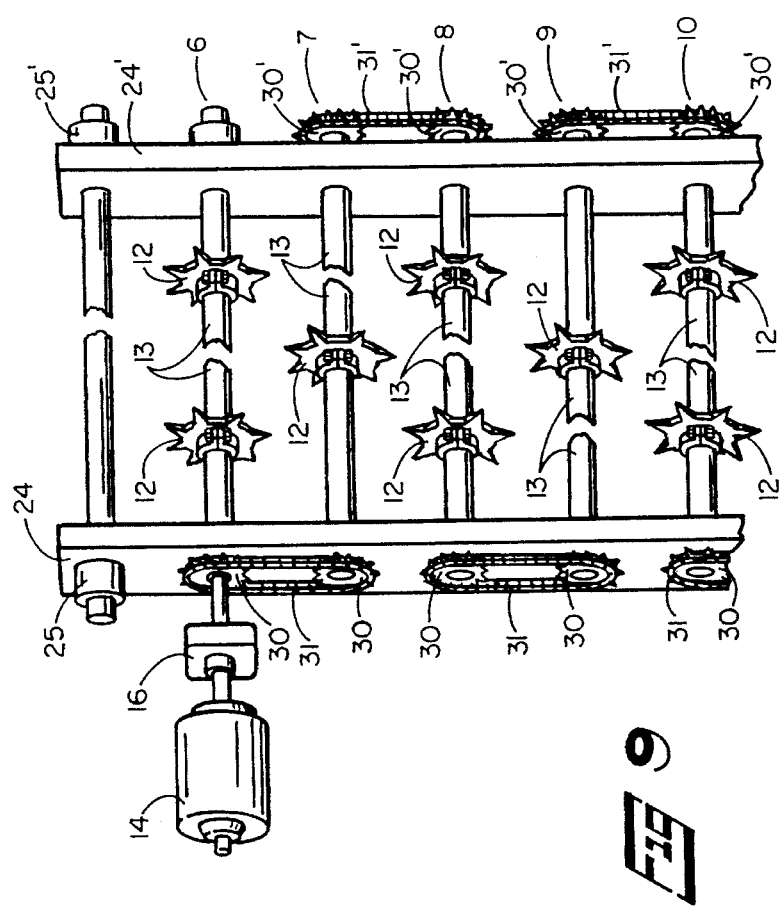
FIG. 9—Enlarged sectional view of picker cartridge showing sprocket and chain connection of drive and driven axles of picker tooth wheels and spacing of picker tooth wheels.

As further description of the drawings, FIGS. 5 and 9 show the mounting of picker tooth wheels 12 mounted on picker shafts 13 to better show this part of the apparatus more clearly by not including the scraper bar 45 including tooth segments 42 and the base 43 of the scraper bar. Now referring now to FIGS. 17 and 18 the scraper bar 45 is shown in its mounted position in relation to picker wheel 12 and shaft 13, in which position the removed wire binding from the bale is removed from the shafts 13 on operation of this apparatus. Thus the scraper bar serves as the means of removing wire scrap from the shredded bale which may wind around shafts 13, and picker wheels 12.

DETAILED DESCRIPTION OF INVENTION

This invention is to disclose apparatus for debaling bales see FIG. 1, comprising a bale conveyor 4, and a picker cartridge FIG. 11, 23,mounted at the outlet end of the conveyor 4 and the picker cartridge 23 suspended on pivot pin mount bearing 25 and the picker cartridge 23 having a plurality of picker tooth wheels 13 mounted on a picker shaft or axle 13 as shown in FIG. 5 and a plurality of picker tooth wheel shafts 13 with a plurality of picker tooth wheels 12 mounted thereon and, a magnet mount bank 20 FIGS. 1, 2, 3, and 8 and an endless belt 27 FIGS. 2, 3, 7, and 8 over and around the magnet mount bank (see FIG. 2 and 8) and the magnet mount bank 20 hang mounted on a pivot bearing mount 38 (see FIGS. 2, 3, 7 and 8) and the magnet mount bank 20 mounted on an incline or diagonally (see FIGS. 2, 7, 8 and 11) under the picker cartridge 23 and, the magnet mount bank 20 hang mounted on a swing or pivot bearing mount, 38 at a diagonally adjustable or inclined angle, by means of a hydraulic cylinders 22, 22' mounted (see FIG. 1) on the free end of the magnet mount bank, on the opposite end from the swing or pivot bearing mount 38.

Pillars 5, 5' support the picker cartridge 23 pin mount bearing 25.

Further, disclosure of apparatus of this invention for debaling bales includes a picker cartridge 23 with a plurality (see FIG. 9) of picker shafts or axles 13 and a plurality of picker wheels 12 mounted on each of the picker shafts or axles 13 and sprocket wheels 30, 30' (see FIG. 9) mounted on the outer ends of each of the picker shafts or axles 13 and sprocket chains 31, 31' connecting the sprocket wheels 30, 30' in pairs on alternate shaft ends such that all picker shafts or axles 13 are rotatable in concert, and in the same direction and, motive power connected onto at least one of the plurality of picker shafts 13 to rotate all of the plurality of picker shafts 13 in concert and in the same direction.

The above mentioned sprocket chains may be of plastic or a polymer for easy breakage in case of a jam in the cartridge.

In this discussion the words "shaft" and "axle" may be used interchangeably

To guide the debaled material 36, and 35 the wire banding scrap onto the endless belt 27, over the magnet bank 20, hood side walls 2, 2' as noted in FIGS. 1, and 2 to guide the material onto the belt 27.

Pillars 5, 5' as noted in FIG. 2, support the apparatus of this invention, and further other pillars are also used in conjunction with the ones shown.

Figure 10:
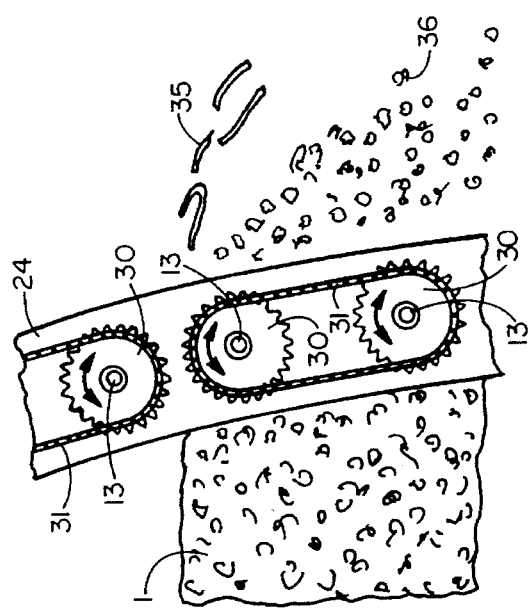
FIG. 10—Enlarged section elevational view of sprocket chain drive on shafts of picker cartridge and inlet and outlet of bale and debaled material.

Reference is now made to FIGS. 6 and 10 which are magnified sections of portions of the picker cartridge 23.

To guide the debaled material 35 wire or steel strap banding scrap and debaled material 36, on to the endless belt 27 over the magnet bank 20, hood side walls 2, as noted in FIG. 2, guide the material on to the belt 27 for removal of the binding wire or strap.

The picker cartridge 23 is further described as having a plurality of picker shafts 13 and a plurality of picker tooth wheels 12 mounted on the plurality of shafts 13 and the shafts 13 mounted on and between picker cartridge side frames 24, 24' of said picker cartridge 23 and the end segments of the side frames 24,24', opposite the swing mount 25 and 26 for the picker cartridge side frames 24, 24' curved inward (see FIGS. 2 6, 7, and 10) toward bale conveyor by an amount of about 10° to 15° for the end segment of about one third of total length of side frames 24, 24' of the picker cartridge 23, and the curved inward segment having a radius of about one quarter to one third of the length of picker cartridge side frames 24, or 24'.

There is now disclosed a method of removing scrap binding wire or tramp iron 35 from the flow of debaled material, by means of a magnet mount bank 20 mounted on an incline and overlaid by an endless belt 27 mounted on pulleys, 28, 34 for revolving the endless belt 27 upwards around the magnet mount bank 20 in an upward direction, and as the debaled material, which is a mixture of 35 debaled material and scrap wire binding 36, falls on the moving endless belt 27 (see FIG. 10) the scrap wire binding 35 is carried upward on the moving endless belt over the magnet mount bank 20 for disposal while the debaled material 36 (free of wire scrap) falls downward from the inclined endless belt 27 over the magnet mount bank 20 for further processing.

In FIG. 6 is shown the picker cartridge side frame 24 with shafts 6, 7, 8, 9, 10, and 11 and sprockets 30 mounted on the shafts with sprocket chains 31 connecting alternate sprockets, and shaft bearing mount 26 for picker cartridge and hydraulic cylinder 3, for picker cartridge angle adjustment as needed on debaling. FIG. 10 is a magnified side elevation view of picker cartridge frame 24 showing sprockets 30 and sprocket chain 31 and directional arrows indicating the sprockets can be turned in either direction and the bale 1 is feed inlet and 35, 36 is wire binding scrap and debaled material respectively.

The picker cartridge 23, mounted on mounts 25 and 26, see FIG. 2, can be adjusted to an incline by means of hydraulic cylinders 3, 3', for picker cartridge incline or diagonal adjustment by raising or lowering the free end opposite the mounts 25 and 26 of the picker cartridge 23.

Further, this invention discloses means or apparatus for wire removal apparatus on debaling bales which includes a rotatable endless belt 27 (see FIGS. 2, 7, and 8) mounted on an upper magnetized roller pulley 34 and a lower endless belt magnetized idler roller pulley 28, and each pulley mounted horizontally, one of the pulleys mounted at the upper end of the magnet mount bank 20 and one of the pulleys mounted at the lower end of the magnet mount bank 20, and the endless belt 27 mounted lengthwise over and around the magnet mount bank 20 and mounted over the 28 and 34 pulleys and motive power connected to at least one of the pulleys, and the motive power can include a gear drive for speed control. Reference is now made to FIG. 3, which is a plan view of magnetic mount bank 20, gear drive 33 and magnetic bank belt drive motor 32, placed at the upper roller for driving the endless belt 27 over the magnetic bank 20.

Referring now to the magnetized roller pulleys, 28 and 34, can be identified as MAGNA-ROLLS, as manufactured by ERIEZ MAGNETICS CO. ERIE, Pa. 16514. In regard to the magnet mount bank 20, the magnetic components may be assembled magnetic components or components of MAGNA-RAILS as also supplied by the ERIEZ MAGNETICS CO. as noted above.

To adjust the incline of picker cartridge 23, there is attached to the end opposite of the 25 swing or pivot pin mount bearing for picker cartridge side frame, 3, 3' hydraulic cylinders for incline adjustment of picker cartridge, for raising or lowering the bottom or free end of the picker cartridge 23 to adjust the incline.

FIG. 4, is an elevation view of the outlet side of the picker cartridge 23, and shows the picker cartridge shafts or axles 6 to 11 with picker tooth wheels 12 mounted on the shafts 6, 7, 8, 9, 10 etc, and pivot or swing shaft bearing mount 26 for the picker cartridge 23, and hydraulic cylinders 3, 3' for picker cartridge adjustment on contact with the bale 1 feed for debaling or pull apart.

FIGS. 12, 13, 14, and 16 show side view of 3 tooth, 4 tooth, 8 tooth and 5 tooth picker tooth wheels, respectively and FIG. 15 shows a cross sectional view of, for example, the 8 tooth picker wheel of FIG. 14.

Referring further to the picker tooth wheels, of FIGS. 12, 13, 14, 15, and 16, these wheels are split, with a split hub 39 welded to each section of the split picker tooth wheels and a keyway 40 on each wheel and hub to match keyways 40' in each of the picker shafts 13, of the picker cartridge 23.

Referring now to FIG. 17, is shown a sectional view of picker cartridge 23 and picker axle or shaft 13, and scraper bar 46, mounted on angle or "L" iron mount 41, by means of fasteners 44, which may be rivets, bolts or welding, and scraper bar tooth segments 42 of the scraper bar 46 extending to the shafts 13 and these tooth segments 42 straddle the picker tooth wheels 12, to remove or prevent winding of the removed bale wire or binding strap from the picker axle shafts 13.

The angle or "L" iron 41 is mounted on each end on the picker cartridge side frame 24. FIG. 18 is a magnified end view of the scraper bar 45 and teeth 42 in relation to a picker shaft 13. The scraper bar 45 as shown in FIG. 22 can be further identified as "a toothed scraper bar", and such tooth scraper bar 45 is mounted for each shaft 13 of the picker cartridge, such that tooth segments 42, contact shafts 13 of picker cartridge 23. The tooth segments of the scraper bar are of a trapezoidal shape, and the spaces between the tooth segments are also of trapezoidal shape, (see FIGS. 19, 20, 22) and tooth segments straddle picker tooth wheel. See FIGS. 17 and 18 to show relation of rotation of picker tooth wheels 12 and the scraper bar 45, and scraper bar tooth segments 42.

FIG. 19 is front elevational view of the mounting of scraper bar 45 at a shaft 13 of the picker cartridge 23 and scraper bar tooth segments 42 straddling picker wheels 12, and base 43 of scraper bar 45 attached to angle iron 41.

FIG. 20 is a sectional elevation view of the scraper bar 45.

The picker cartridge 23 is mounted on suitable frame support brace 17 and extension 18 and the magnet mount bank 20 is mounted on a suitable frame 19.

To prevent scattering of debaled material suitable sidewalls retainers 37 and hood 2 are positioned between the picker cartridge 23 and the magnet mount bank, 20 to thus guide the outlet material from the picker cartridge 23 to the magnet mount bank 20, which is diagonally or incline mounted or hung on a swing or pivot bearing mount 38 for the magnet bank 20, and hydraulic cylinder 22 for magnet mount bank 20 angle adjustment to the desired incline or slant angle A.

In FIG. 7, the picker cartridge 23, is shown in up-swing pivoted position with the picker cartridge 23 swung away from the bale 1. This is to clear out any blockage of the rotation of the shafts 13, and further on blockage of the rotation of the shafts 13 suitable means can be had to protect against power motor burn out by having a slip clutch in the picker cartridge drive gear box 16, or switch control means can be provided to turn off the motor drive 14, and activate hydraulic cylinders 3, 3' for picker cartridge incline adjustment, or as an alternate to reverse the rotation of the picker shafts 13.

In all of the disclosure of this invention picker shafts are referred to collectively as "13", which includes all shafts 6–11 of the picker cartridge 23.

The preferred incline or diagonal angle A for mounting the magnet bank 20 is in the range of 40° to 80° and a preferred angle of incline or diagonal of about 60° from horizontal as shown in FIG. 7.

Note in FIGS. 2, 6, 7, 8, 10 and 11 side elevational views that the picker cartridge side frames 24, 24' are curved on the end opposite the swing pivot mount 25 end, and to further define this curve, reference is made to FIG. 21 to describe the radius R of the curve which is preferred to be from 15 inches to about 20 inches, based on cartridge side frames of approximately 6 feet and further the total angle to be from 10° to 15° to generate the arc. The picker cartridge side frames 24, 24' are the same contour and side frame 24' is a mirror image of side frame 24.

Rotation of the picker shafts 13 with picker wheels 12, would on debaling normally be clockwise, when observed from the right side of the debaler as shown in FIG. 2, for maximum pick apart, but minimum output, while for maximum output with minimum pull apart the rotation of the picker shafts 13 with picker wheels 12 would be counter clockwise.

The choice of picker wheel diameter and number of teeth for debaling depends on the material to be debaled.

Referring now to FIG. 3, showing the magnet mount 20, and endless belt 27, there is shown a cutaway segment 29 which is "see through" segment to illustrate endless belt 27 to show relation to magnet bank components.

Referring now to the picker tooth wheels, in general the larger diameter wheels are suggested for debaling office waste paper, while the smaller diameter wheels are suggested for use in debaling cardboard, other wheel diameters may be used for other baled materials.

The RPM'S of the picker tooth wheels can be from 30 RPM to 500 RPM depending on material being debaled.

The method of debaling bales with the above apparatus can be described as a picker cartridge having a plurality of picker wheels mounted on a shaft and a plurality of picker shafts with the picker wheels revolving at 30 to 500 rpm contact the bales to be debaled and debaled material, including wire binding scrap flowing onto upward revolving endless belt over an inclined magnet bank, and the wire binding scrap conveyed upward and over the upper end of the inclined magnet bank and debaled material free of wire binding scrap collected at the bottom end of the inclined magnet bank.

In the above description the words "incline" and the word "diagonal" are used interchangeably.

Having described our invention we claim:

1. Apparatus for debaling bales comprising;

a—a bale conveyor and a picker cartridge mounted at the outlet end of said conveyor and said picker cartridge suspended on pivot bearing mount and said picker cartridge comprised of a plurality of picker tooth wheels mounted on a shaft and a plurality of picker tooth wheel shafts with a plurality of said picker tooth wheels mounted thereon and, b—a magnet mount bank and an endless belt over and around said magnet mount bank and said magnet mount bank hang mounted on a swing bearing mount and said magnet mount bank mounted at an incline under said picker cartridge and, c—said magnet mount bank, hang mounted on said swing bearing mount, at an incline or diagonally adjustable angle, by means of a hydraulic cylinder mounted on the free end of said magnet mount bank.

2. Apparatus of claim 1 for debaling bales, wherein further improvement comprises;

a—a picker cartridge with a plurality of picker shafts and a plurality of picker wheels mounted on each of said picker shafts and sprocket wheels mounted on the outer ends of each said shafts and, b—a scraper bar having scraper tooth segments and said scraper bar mounted on angle iron mount for each said shaft of the picker cartridge and said scraper bar tooth segments extending to each of said shafts and said tooth segments straddle said picker tooth wheels and c—sprocket chain connecting said sprocket wheels in pairs on alternate shaft ends such that all picker axles are rotatable in concert, and in the same direction and, d—motive power connected onto at least one of said plurality of picker shafts to rotate all of said plurality of picker shafts in concert and in the same direction.

3. Apparatus for debaling bales of claim 2, wherein the improvement further comprises;

a—a rotatable endless belt mounted on an upper roller pulley and a lower roller pulley and each said pulley mounted horizontally, one of said pulleys mounted at the upper end of said magnet mount and one of said pulleys mounted at the lower end of said magnet mount bank and b—said endless belt mounted lengthwise over and around said magnet mount bank and mounted over said pulleys and motive power connected to at least one of said pulleys, and b—said motive power comprises an electric motor and drive gear.

4. Apparatus for debaling bales of claim 3, wherein further improvement comprises;

a—said upper roller pulley and said lower roller pulley comprised of magnetized roller pulleys.

5. Apparatus of claim 1 for debaling bales wherein the improvement comprises;

a—a picker cartridge consisting of a plurality of shafts and a plurality of picker tooth wheels mounted on the plurality of shafts and said shafts mounted on and between side frames of said picker cartridge and b—a scraper bar having scraper tooth segments and said scraper bar mounted on angle iron mount for each said shaft of the picker cartridge and said scraper bar tooth segments extending to each of said shafts and said tooth segments straddle said picker tooth wheels and c—end segments of said side frames opposite the swing mount for said picker cartridge frame curved inward toward bale conveyor by an amount of about 10° to 15° for said end segment of about one third of total length of said side frames of said picker cartridge.

6. A method of removing scrap binding wire or metal strapping from a flow of debaled material, by means of a magnet mount bank mounted on an incline and an endless belt mounted on pulleys and revolving said endless belt upwards around said magnet mount bank in an upward direction, and debaled material, which is a mixture of debaled material and scrap wire binding falls on said moving endless belt said scrap wire binding moves upward on said moving endless belt over said magnet mount bank for disposal and said debaled material, free of wire scrap, falls downward from said inclined endless belt over said magnet mount bank.

7. A method of debaling bales, wherein the improvement comprises;

a picker cartridge having a plurality of picker wheels mounted on a shaft and a plurality of picker shafts and said picker wheels in said picker cartridge and said picker shafts with said picker wheels revolving at 30 to 500 rpm contact bales to be debaled and debaled material including wire binding scrap flowing onto upward revolving endless belt over an inclined magnet bank and said wire binding scrap conveyed upward and over the upper end of said inclined magnet bank and debaled material free of said wire binding scrap collected at the bottom end of said inclined magnet bank.

* * * * *